Oct. 15, 1929.  F. MARIANI  1,731,584
DOUGH KNEADING MACHINE
Filed Sept. 8, 1928  2 Sheets-Sheet 2
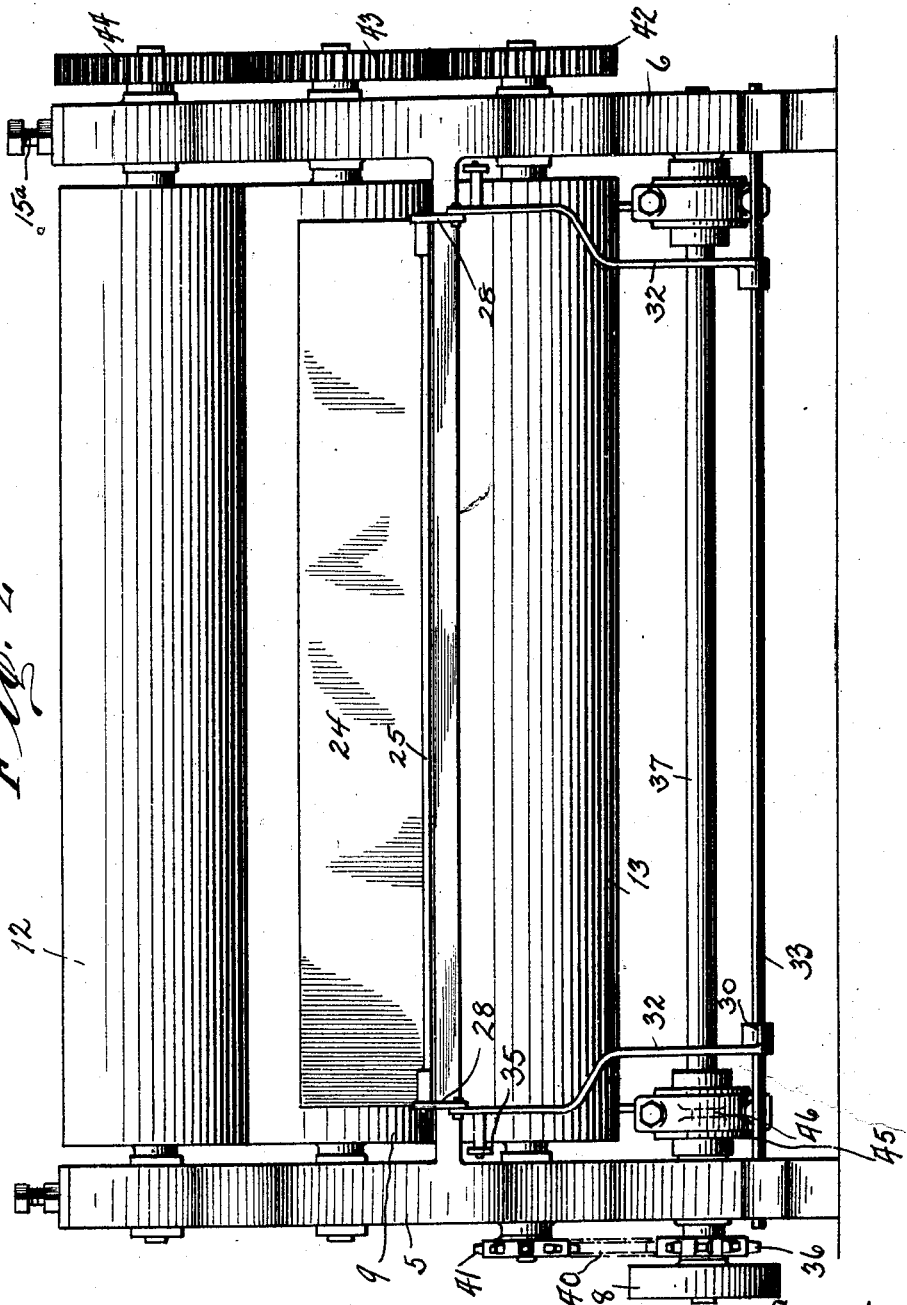
Inventor
Francesco Mariani
By his Attorney
Aaron L. Applebaum Patented Oct. 15, 1929

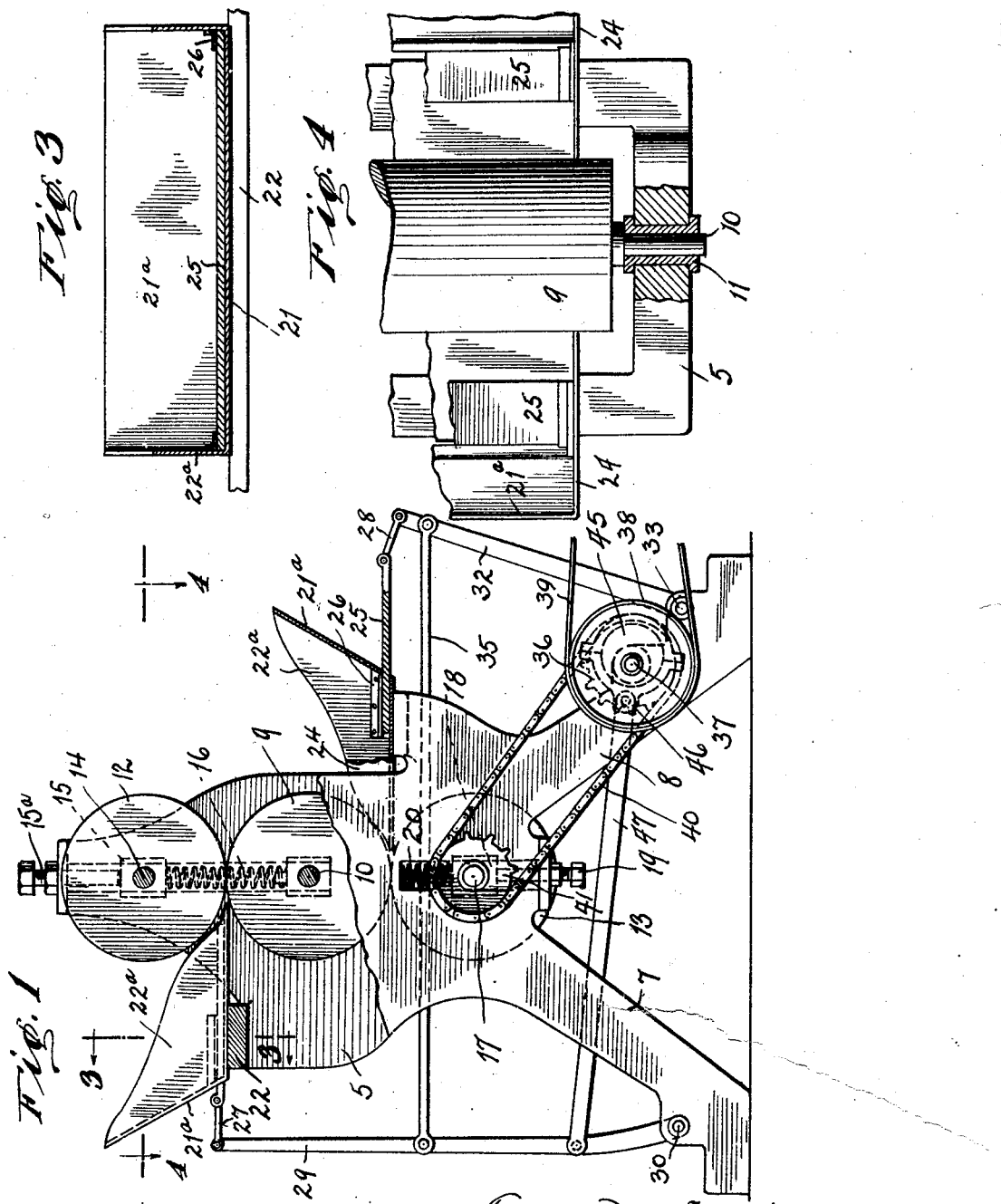

1,731,584

UNITED STATES PATENT OFFICE

FRANCESCO MARIANI, OF NEW YORK, N. Y.

DOUGH-KNEADING MACHINE

Application filed September 8, 1928. Serial No. 304,690.

This invention relates to dough kneading machines and more particularly to an automatic machine for treating large batches of material after it leaves the mixer.

One of the objects of my invention is to provide a dough kneading machine in which the material is caused to pass between a series of rollers in two directions including provision for automatically forcing the material beneath the rollers.

A further object of my invention is to provide a dough kneading machine including a series of superposed, adjustable rollers and pusher plates for forcing the material between said rollers, said rollers and plates being simultaneously driven.

To enable others skilled in the art to more fully comprehend the underlying features of my invention reference is had to the accompanying drawings forming a part of the specification in which Fig. 1 is a side view illustrating my invention.

Fig. 2 is a front view.

Fig. 3 is a section taken on the line 3—3 of Fig. 1.

Fig. 4 is a fragmentary section taken on the line 4—4 of Fig. 1.

Referring now to the drawings, 5, 6 designate the sides of a stationary rigid frame having diverging supporting legs 7, 8 on which the mechanism is mounted. The frame supports an intermediate roller 9 having end stub shafts 10 rotatable in stationary bearings 11. Mounted on the frame in vertical alignment with the intermediate roller is a similar top roller 12 and a bottom roller 13, each being of the same size and dimension. The shaft 14 of the top roller is supported in an adjustable bearing block 15 which is held under tension and in engagement with the intermediate roller by means of a threaded bolt 15 and tension spring 16. The bottom roller is provided with a similar shaft 17 supported in an adjustable bearing block 18 that is held under tension and in engagement with the intermediate roller by means of a threaded bolt 19 and tension spring 20 as clearly shown in Fig. 1.

From the above construction, it will be seen that the top and bottom rollers being in constant engagement with the intermediate roller but held under tension by means of the spring will permit the material to pass beneath and be engaged by the rollers to flatten or knead the dough. In order to render the machine automatic, I provide a front open receptacle or container, the bottom 21 being supported on a transverse cross bar 22, said receptacle having an angular back wall 21ª and substantially triangular shaped ends 22ª receding from the back wall to the open front of the receptacle. The width of the receptacle is substantially the width of the rollers so that a large quantity of material may be deposited and spread out to be fed to the kneading rollers.

The frame is also equipped with a similar receptacle at the front of the machine to receive the batch of material after it has passed through and between the intermediate and top rollers. The open front of the bottom receptacle designated in its entirety by numeral 24 is disposed so as to permit the batch of material to be fed between the said intermediate roller and the bottom roller in the same manner as above described. In other words as the material is fed between the intermediate and top rollers, it passes from the top receptacle into the bottom receptacle whereupon it is again fed between the intermediate roller and the bottom roller in the reverse direction.

The feeding mechanism for each receptacle comprises a flat pusher plate 25 operable on the bottom of each receptacle being held by angle bars 26. The said pusher plates extend through recesses adjacent the bottom of the rear wall of the receptacles and are pivotally connected to short links 27, 28 respectively. The links 27 are connected to the upper ends of reciprocating levers 29, the lower ends of said levers being pivotally mounted as at 30 on a cross rod 31 extending between the front legs of the machine frame. The links 28 are similarly connected to shorter reciprocating levers 32 pivotally connected to a cross rod 33 extending between the rear legs of the frame. The said reciprocating levers are connected by a pair of longitudinal rods 35 so that the reciprocation of one lever simultaneously reciprocates the opposite lever. In other words when the push plate of the upper receptacle is urged inwardly or toward the roller feeding the material therebetween, the push plate of the front or lower receptacle is moved outwardly or in the position shown by Fig. 1. The alternate reciprocation of the push plates feeds the material between the rollers.

The power of driving mechanism for the rollers and the reciprocating mechanism for the push plates as shown in Figs. 1 and 2 comprises a sprocket wheel 36 on one end of a driven shaft 37 having an outside pulley 38 driven by a belt 39 from any suitable source of power such as an electric motor (not shown). A sprocket chain 40 trained over the sprocket wheel 36 and a sprocket wheel 41 on the shaft of the lower roller drives the intermediate and top rollers, the shafts of all of said rollers having gears 42, 43, 44 in meshing relation as shown in Fig. 2.

The drive shaft 37 is also equipped with an eccentric 45 adjacent each end, each eccentric having an eccentric lug 46 to which is pivotally connected one end of a connecting rod 47, the opposite end of said rod in each instance being connected to the longer reciprocating levers at a point below the connecting rods. The rotation of the shaft 37 driving the eccentrics communicates reciprocating motion to the levers and links connecting the push plates whereby the material is fed beneath the rollers which are simultaneously driven through the sprocket and chain drive and the mesh gears as above described.

While I have shown and described my invention with some degree of particularity, it will be realized that other modifications and changes may be resorted to under special conditions. I therefore do not wish to be limited and restricted to the exact details shown and described but reserve the right to make such changes and modifications as may fairly fall within the scope of the subject matter now being claimed.

Having shown and described my invention what I claim as new and desire to secure by Letters Patent is:—

1. A machine of the class described comprising a frame, a series of superposed rollers mounted on said frame, reciprocating means for feeding dough between said rollers in opposite directions and means for driving said rollers.

2. A machine of the class described comprising a frame, a series of superposed adjustable rollers mounted on said frame, reciprocating means for feeding dough between said rollers in opposite directions and means for simultaneously driving said rollers.

3. A machine of the class described comprising a frame, an intermediate roller and a top and bottom roller supported by said frame, reciprocating means for feeding dough between the intermediate roller and the top and bottom rollers in opposite directions and means for driving said rollers.

4. A machine of the class described comprising a frame, an intermediate roller and a top and bottom roller supported by said frame, a top and a bottom receptacle located at the front and rear respectively of said frame said receptacles having means for feeding dough between the top roller and the intermediate roller and the bottom roller and intermediate roller respectively in opposite directions and gearing for driving said rollers.

5. A machine of the class described comprising a frame, an intermediate roller and a top and bottom roller adjustably supported by said frame, a top receptacle open at its front mounted on the frame including feeding means in the bottom of the receptacle for forcing material between the intermediate and top roller, a similar receptacle and feeding means mounted on the rear of the frame for forcing the same material between the intermediate roller and bottom roller in the opposite direction, means for simultaneously reciprocating said feeding means and means for driving all of said rollers.

6. A machine of the class described comprising a frame having an intermediate roller and adjustable rollers above and below the said intermediate roller and in engagement therewith, a receptacle mounted at the front and rear of the frame, a push plate in the bottom of each receptacle for forcing material in one direction beneath the top roller and intermediate roller and in the opposite direction between the said intermediate roller and the bottom roller, interconnected levers for reciprocating said push plates, gearing for operating said rollers, a drive shaft, sprocket and chain gearing for driving said shaft and said rollers and eccentrics on the drive shaft for actuating the interconnected levers.

7. A machine of the class described comprising a frame, having an intermediate roller, a top and bottom adjustable roller in engagement with said intermediate roller, a receptacle open at its front and having a push plate for forcing material between the top roller and the intermediate roller, a similar receptacle located below and at the rear of the frame for receiving the material after it has passed between the said rollers, a similar push plate for forcing the material between the intermediate roller and the bottom roller and in the opposite direction and gearing for driving all of said rollers.

In testimony whereof I affix my signature.

FRANCESCO MARIANI.